May 28, 1940.  M. R. KONDOLF  2,202,010

PURGING APPARATUS AND METHOD OF USE

Original Filed March 6, 1937  2 Sheets—Sheet 2

INVENTOR
Mathias R. Kondolf

Patented May 28, 1940

2,202,010

UNITED STATES PATENT OFFICE 2,202,010

PURGING APPARATUS AND METHOD OF USE

Mathias R. Kondolf, New Canaan, Conn.

Application March 6, 1937, Serial No. 129,506
Renewed August 24, 1939

19 Claims. (Cl. 62—115)

This invention relates to apparatus, and methods of use in connection with the purging of non-condensible or foreign gas from a mixture with a condensible refrigerating medium, as used in a refrigeration system or plant.

The term "refrigeration system" as used in this specification defines and refers to a compression refrigeration system in which a refrigerating medium is circulated in a closed path or cycle. The refrigerating medium being wholly liquefied in one part of the cycle, by the extraction of heat from it while it is under a suitable condensing pressure, and the refrigerating medium being wholly vaporized by the addition of heat to it in another part of the cycle.

The terms "refrigerating medium" and "refrigerant" as used in this specification define and refer to a substance capable of substantially instantaneous change from liquid to vapor, or vice versa, upon a change in its pressure or temperature. It has a wide range of critical complementary pressures and temperatures at which such changes of state occur. When the substance is at a critical pressure and temperature, it is changed from one state to the other by the absorption of heat from, or loss of heat to, surrounding bodies. The amount of heat involved in such change is known as the latent heat of vaporization or condensation, and the addition or subtraction of such latent heat results only in a change of state of the substance without varying the temperature or pressure thereof.

A compression refrigeration system comprises a liquid receiver to contain a quantity of the liquefied refrigerating medium; evaporators in which the liquid refrigerant is vaporized and thereby takes up heat to cause the refrigerating effects desired; compressors to draw the vaporized refrigerant from the evaporators by suction, compress same and force the compressed vapor into the plant condensers where it is cooled (generally by water circulation) until the temperature of the compressed vapor is reduced to the point of condensation for the pressure existing on the vapor, and the latent heat of condensation being removed, results in the liquefaction of the refrigerating medium and its flow into the liquid receiver to complete the cycle.

In compression systems, particularly when evaporation is carried out at sub-atmospheric pressure, air leaks in through pipe fittings, joints and stuffing-boxes of the compressors and mixes with the vaporized refrigerant delivered to the condensers. Other non-condensible gases are formed by chemical and electrolytic action of the refrigerant. These non-condensible gases, in a compression system, are found, or accumulate, in the condensers and in the liquid receiver. They are mixed with the vaporized refrigerant and for the reasons pointed out hereafter, it is most important that such non-condensible gases be separated from the true refrigerating medium in use, and purged from the system.

Particular objects of my invention are as follows:

To provide an apparatus to effect a two stage extraction of heat from the mixture.

To provide an automatic means to maintain substantially uniform plant suction on certain elements of the apparatus.

To provide thermostatic means for controlling the flow of mixture into the apparatus in relation to the temperature existing in portions thereof.

To provide means to maintain a circulation of liquefied refrigerant through heat absorbing elements of the apparatus, to increase the efficiency of the apparatus.

To provide for the use of salvaged refrigerant to impel a circulation of refrigerant within the cooling coil.

To provide for the use of salvaged refrigerant to extract heat from the mixture.

To provide a pool of liquefied refrigerating gas in the separator drum and in one modification of the invention to inject the mixture directly into said pool.

To provide a casing and a mixture nozzle to compel a circulation outside of the cooling coils.

To provide a form of evaporator coil in purging apparatus which is adapted to serve as a baffle.

To provide an angular path and a downwardly directed flow of the non-condensible gas effluent from the apparatus to salvage particles of liquefied refrigerant entrained therewith.

To provide a refrigerated tank annularly disposed around the separator drum to act as an insulator, as a pre-cooling tank, as a surge drum and also to refrigerate the wall of the separator drum.

To provide in purging apparatus a spray of liquefied refrigerating medium directly into a pre-cooling tank to obtain a low temperature in said tank.

To maintain three ranges of pressure, namely, suction, intermediate and high pressure in the apparatus.

To provide an automatic relief valve to vent the non-condensible gas at a pre-determined pressure.

To provide automatic means to place the apparatus in and out of service in the refrigerating plant, in relation to pressures arising in the operation of the plant.

To provide apparatus and methods which will effect the transfer of heat between moving bodies or streams, so that insulating films are constantly swept away during the operation of purging.

To provide apparatus and methods of use which will permit a continuous purging of non-condensible gases to be carried on, while the plant is in operation.

To these and other ends the characteristic features and advantages of my improvements will more fully appear in the following description and the accompanying drawings in illustration thereof.

The need for an efficient separator to remove non-condensible gas from a refrigerating system is generally recognized.

The phenomenon of partial pressure of gases compels the use of a condensing or head pressure in the system, equal to the sum of the actual condensing pressure of the refrigerating medium used, and of the pressure of the air or other non-condensible gas which may be present. This excess pressure increases the power required and results in a marked loss of efficiency.

The presence of non-condensible gas in the system is likewise troublesome on the evaporating or suction side of the system since the pressure must be reduced below normal (to obtain any desired degree of temperature) to compensate for the partial pressure of the non-condensible gas present. Mawson, in the Proceedings of the Institute of Mechanical Engineers, (London) 1932, states that the introduction of 5% air in an ammonia compression system reduces the coefficient of performance by the surprising figure of 22.3%.

The apparatus described herein accomplishes the separation of the gases by condensing or liquefying the refrigerating medium from a mixture with non-condensible gases. The mixture is withdrawn from the top of the liquid receiver or from the plant condensers, and after being cooled in one stage of the apparatus is introduced into an isolated drum maintained at a temperature and pressure adequate to condense the refrigerating medium from the mixture. The non-condensible gas is allowed to pass out of the system, while the salvaged refrigerating medium is used to cool the incoming mixture.

The efficiency of purging apparatus of this type is dependent upon the transfer of heat from the mixture and a principal feature of this invention is to have such heat transfer take place under the most favorable conditions.

A most important factor in heat transmission to a refrigerating medium, undergoing a change of state, is the resistance or insulating effect of the gas film formed at the transferring surfaces. It is generally agreed that a much larger percentage of the available temperature head is required to force heat through such a gas film than through the plate separating the transferring mediums.

The gas films, as well as liquid insulating films, can be practically destroyed by the sweeping action of a current or stream of the mediums moving over the separating surfaces, and as will appear hereinafter, and from the structures shown in the drawings, both the heat emanating and the heat absorbing mediums are maintained in motion during the operation of my improved apparatus, in order to obtain this important result.

In the drawings, in which like reference numerals designate like parts

Figure 1:
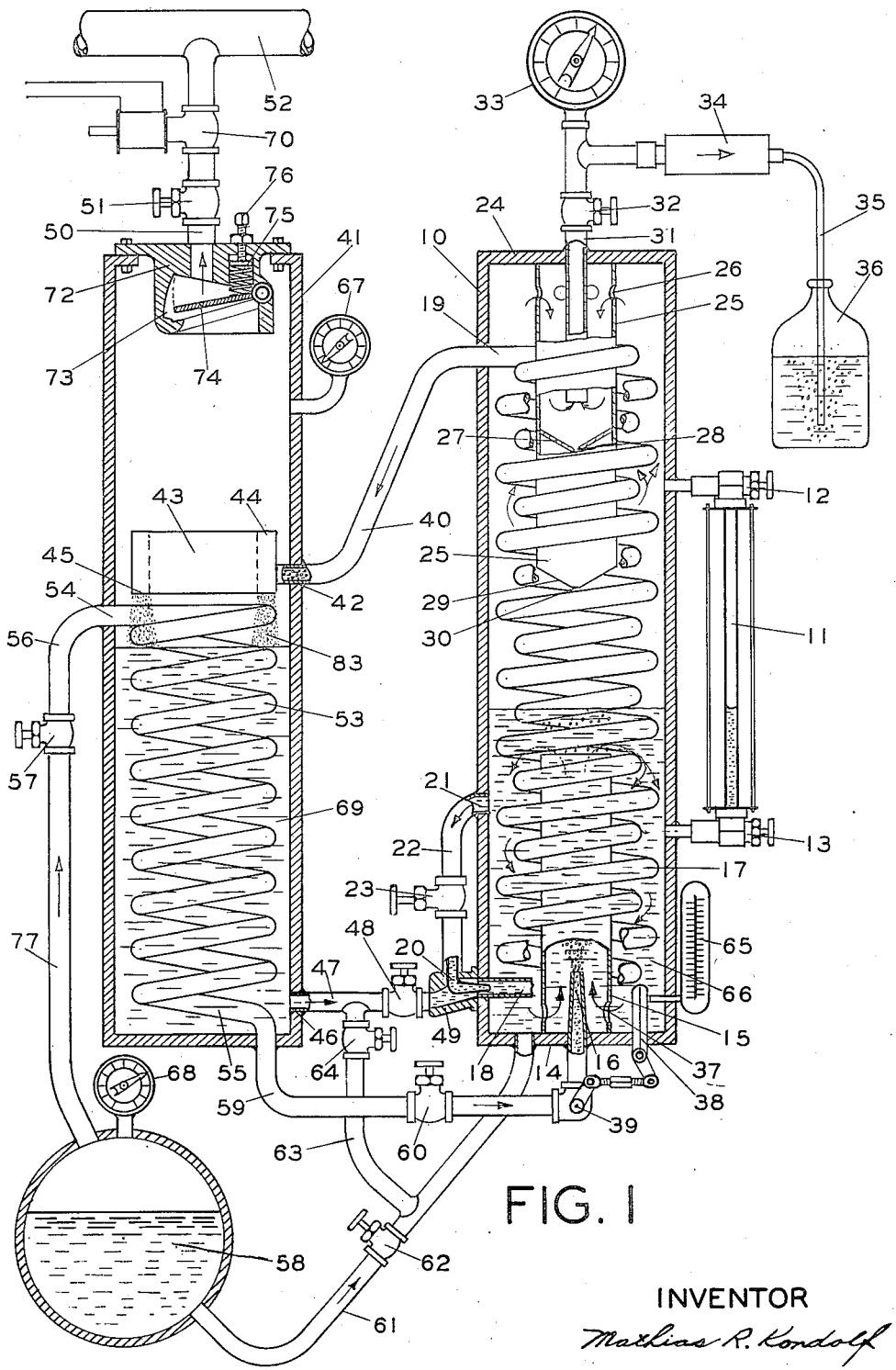
Fig. 1 is an elevation of one form of the apparatus, and is shown partly in section and with parts broken away to more clearly illustrate the structure.

Referring to Fig. 1 reference numeral 10 designates a separator drum, 11 is a gage glass mounted between the valves 12 and 13 and showing the liquid level in the drum. The lower end 14 of the drum 10 supports a casing 15 which is open at the top and is provided with openings 37 near the bottom. Projecting into the casing 15 is the nozzle 16 through which the mixture to be separated is fed into the drum.

Figure 2:
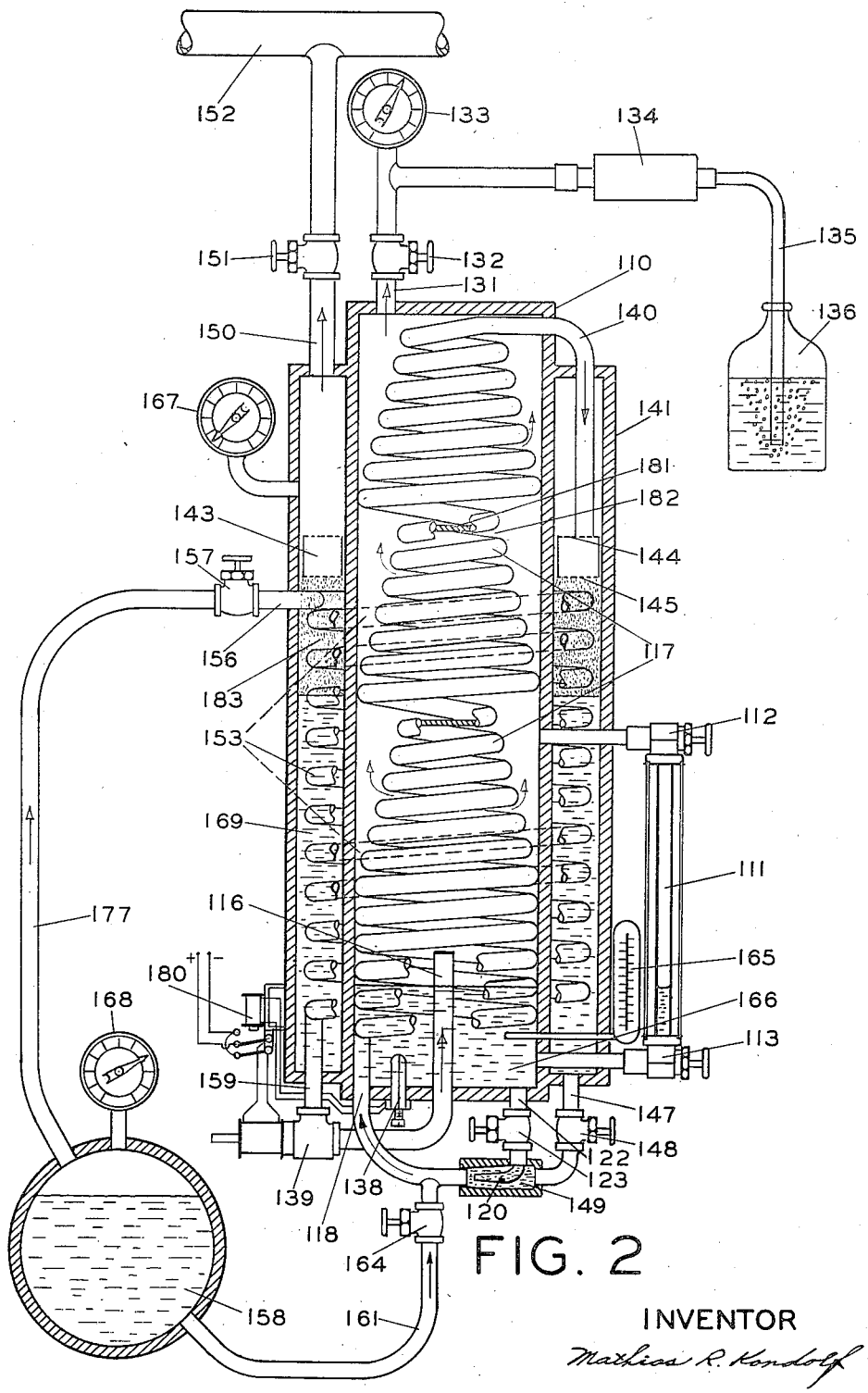
Fig. 2 is an elevation of a modified form of the apparatus, and is shown partly in section and with parts broken away to more clearly illustrate the structure.

Mounted within the separator drum 10 is the heat absorbing element or evaporator coil 17 and this coil may be of changing diameter as shown in Fig. 1 or of spiral form as shown in Fig. 2, in order to increase its efficiency by acting as a baffle. The lower end 18 of the coil 17 is connected with the tank 41 through the injector housing 49 and the pipe 47. The upper end 19 of the coil 17 is connected with the tank 41 through the pipe 40 and the spreader 43. These connections provide for the circulation of refrigerant through the coil 17 and the tank 41.

As shown in Fig. 1 a pool or body 66 of liquefied refrigerant is maintained in the tank 10. The opening 21 and the pipe 22 provide for the flow of liquefied refrigerant from the tank 10 through the nozzle 20 which injects the liquefied refrigerant directly into the coil 17. The valve 23 mounted on the pipe 22 provides a controlling means for the flow through the pipe.

Mounted on the upper end 24 of the drum 10, is the tube 25, extending downwardly and surrounding the non-condensible gas outlet or exit pipe 31. Openings 26 near the top of the tube 25 permit the entry into the annular space, between the pipe 31 and tube 25 of the non-condensible gas effluent, together with any minute particles of liquefied refrigerant entrained therewith.

The space between the pipe 31 and the tube 25 is preferably of an area to obtain a rather high velocity of the current of gas moving downwardly, prior to its discharge through the pipe 31. This velocity, coupled with the acceleration due to gravity, imparts considerable momentum to any particles of liquefied refrigerating medium suspended in, or entrained with, the non-condensible gas and causes these liquid particles to impinge upon the baffle 27. The non-condensible gas will pass up the pipe 31 and out of the drum. The current of gas, as well as gravity, will cause any liquid which accumulates on this baffle plate 27 to flow to and through the opening 28. The liquid refrigerating medium thus salvaged by reason of the angular path of exit provided for the non-condensible gas will pass through the opening 30 and fall into the liquid pool 66.

The pipe 31 extends through the upper end 24 of the drum 10 and provides an outlet from the drum 10 for the non-condensible gas which has been separated from the refrigerating medium. The valve 32 is provided in the pipe 31. The pressure gage 33 is connected to the drum 10 through the pipe 31.

Connected to the pipe 31 is the automatic discharge valve 34 which may be set to exhaust at any desired pressure. The valve 34 preferably exhausts through a hose or pipe 35 projecting into the water bottle 36, and under the level of water contained therein.

Instead of using the automatic exhaust valve 34 to control the pressure within the drum 10, it is entirely practical to crack open the valve 32 just far enough to keep the desired pressure in the drum. If the valve 32 is so used, the gage 33 would be mounted directly on the drum 10 to show the pressure therein.

The pipe 40 leads from the upper end 19 of the coil 17 and passes through the wall of the tank 41 at the opening 42. In the tank 41 the pipe 40 discharges into a spreader 43 having a perforated top 44 and a perforated bottom 45. As illustrated, the spreader 43 is ring shaped and the perforations 45 are positioned over the coil 53. The refrigerating medium conveyed into the tank 41, by the pipe 40, is a mixture of vaporized and liquefied medium. Most of the vaporized portion passes upwardly through the perforations 44 in the spreader 43 and the liquefied portion passes downwardly through the perforations 45. A body 69 of liquid refrigerating medium is maintained in the tank 41, with its upper surface far enough below the spreader 43, to provide for a shower 83, of liquefied refrigerating medium, to fall from the spreader.

The level of the body 69 of liquefied medium is maintained in the tank 41 by adjustment of the valve 48 as will be hereinafter described and consequently in operation there is a downward flow of liquefied medium moving over the coil 53. In an optional construction the valve 48 (or its equivalent) may be controlled by a float in the tank 41. Such float may operate the valve directly by leverage connections or may operate same through appropriate electrical connections.

The temperature of the body 69 of the liquefied refrigerating medium in the tank 41 will correspond with the suction pressure existing in the tank 41, and as the mixture flowing through the coil 53 gives up heat, a part of the refrigerating medium will vaporize.

Both the vaporized refrigerating medium discharged into the drum 41 from the pipe 40 and the refrigerating medium vaporized by the absorption of heat in the tank 41, will pass out through the pipe 50 into the plant suction line 52.

The gage 67 shows the suction pressure existing in the tank 41.

Near the lower end of the tank 41, the opening 46 leads into the pipe 47, in which is provided a valve 48, and which connects with the injector housing 49. The injector housing 49 connects with the lower end of the coil 17 in the drum 10.

It will thus be seen that a path is provided for the circulation of refrigerating medium through the refrigerating element 17 and the tank 41 and that the maintenance of a body of liquefied refrigerating medium in the tank 41 will serve to maintain a partially flooded condition of the element 17. As will be described hereinafter the operation of the injector 20 provides a means of forcing the liquefied refrigerant upward through the element 17 and as the injector 20 draws liquefied medium from the tank 41, a recirculation of liquefied refrigerating medium takes place.

After the apparatus is in operation the feed through the injector 20 corresponds to the quantity of liquefied refrigerating medium salvaged from the mixture entering the apparatus through the pipe 77 and the vaporized medium leaving the apparatus through the pipe 50.

Mounted within the tank 41 is the coil 53 having an upper end 54 and a lower end 55. Connected to the upper end 54 of the coil 53 is the pipe 56 provided with a valve 57. The pipes 56 and 77 connect the coil 53 with the top of the plant liquid receiver 58, or with any other point in the system, where non-condensible gas will collect.

Connected to the lower end 55 of the coil 53 is the pipe 59, provided with the valve 60, and also with the valve 39 which is controlled by the thermostat 38. The pipe 59 leads into the nozzle 16 through which the mixture is introduced into the separator drum 10.

From the above description, it will be noted that the mixture of non-condensible gas with vaporized refrigerating medium, flows from the plant liquid receiver (or other point of pick-up) through the coil 53, in heat transfer relation to a body 69 of cold liquefied refrigerating medium which is under suction and requires only heat to vaporize.

From the coil 53 in the pre-cooling tank 41 the mixture which has now given up all of its specific heat and a large part of the latent heat of vaporization of the refrigerating medium in the mixture, flows into the drum 10 and as shown in Fig. 1 directly into the pool of liquefied refrigerating medium maintained in the drum 10.

The pipe 61 carrying the valve 62 leads from the liquid receiver 58 to the interior of the separator drum 10. A branch pipe 63 carrying the valve 64 leads from the pipe 61 and connects with the interior of the tank 41 through the pipe 47, and with the coil 17 through the injector housing 49.

As shown in Fig. 1, and applicable for use with the apparatus of Fig. 2 as well, the suction connection to the tank 41 may be arranged to include means to maintain a substantially uniform suction on the liquefied refrigerating medium in the tank 41 during variations in the plant suction pressure.

This is a matter of particular importance in plants such as breweries, chemical and other manufacturing plants, where great variations in refrigerating load often take place, due to batch cooling of products, etc. and where auxiliary compressors are placed in and out of operation from time to time.

As illustrated in Fig. 1 the pipe 50 connects the plant suction line 52 to the housing 72, which includes a tapered passage 73, having a flap or damper valve 74 mounted therein. The spring 75 engages the valve 74 and the position of the valve is controlled by the adjusting screw 76. The valve is preferably balanced in the passage 74 under normal suction pressure in the plant. If the suction pressure in the plant (and in the suction line 52) decreases, the valve 74 moves upwardly, thereby restricting the available area of the passage 73, and maintaining substantially the normal suction pressure in the tank 41. The design and strength of the spring 75 is based on the range of the suction pressure in the plant and the required deflection in relation to the area of the passage corresponding to the several positions of the valve.

The operation of the apparatus shown in Fig. 1 is as follows.

All of the valves are closed with the exception of gage glass valves 12 and 13 which are opened wide. Valves 64 and 48 are opened wide and then valve 62 is cracked open to permit liquid refrigerant from the receiver 58 to flow into the surge tank 41, separator drum 10 and into the coil 17.

When the liquid level of drum 10 reaches half way in the gauge glass 11 the valves 62 and 64 are closed, and the valve 48 is left open about one-quarter turn. Valve 57 should be wide open.

The automatic exhaust valve 34 has previously been set to exhaust at a pressure of from fifteen to twenty pounds less than the condensing or head pressure existing in the liquid receiver 58.

Valve 51 is now opened grandually and suction placed on the surge tank 41 and the coil 17. This lowered pressure will result in the evaporation of some of the liquid in the tank 41 and in the coil 17 and the apparatus will be under refrigeration.

The liquid pool in the drum 10 when starting the apparatus is under a pressure only slightly less than the condensing pressure of the plant. The refrigerating effect of the coil 17 serves to "sub-cool" this liquid pool below its normal temperature for the pressure existing. As the temperature in the drum 10 is lowered more and more of the vaporized refrigerant above the pool is condensed and the pressure on the liquid pool drops to correspond with the lowered temperature.

When the thermometer 65 shows that the temperature of the liquid in the drum 10 has been "sub-cooled" about 30 degrees below the condensing temperature corresponding to the pressure shown on the gage 33, (for the refrigerant being used) valve 60 may be cracked open permitting the mixture of refrigerant and non-condensible gases to pass from the coil 53 through the nozzle 16 into the liquid pool in the separator drum 10.

As the mixture flows out of the nozzle 16 into the sub-cooled liquid pool, the refrigerant in the mixture will be immediately condensed and added to the liquid pool of refrigerating medium in the drum 10.

The non-condensible gases, like air, will pass out of the liquid pool and build up a pressure above the liquid in the drum 10. When this pressure reaches the point at which the automatic valve 34 is set to exhaust the non-condensible gases will be exhausted and removed from the apparatus, through the pipe 31.

After the separator has been in operation for a short time and the liquid pool enlarges from salvaged refrigerant the valve 23 is gradually opened and liquid refrigerant will be forced through pipe 22 and the injector 20 into the coil 17.

In full operation the valve 23 is adjusted to allow the passage of a quantity of liquid refrigerant equal to that salvaged from the mixture. This results in maintaining approximately a constant level of liquid in the drum 10. As will be described hereinafter the thermostat 38 controls the passage of mixture into the drum 10 and in operation the quantity of refrigerant salvaged is uniform, no matter whether the mixture passing into the drum 10 is "lean" or "rich" in refrigerating medium.

The liquid flowing through pipe 22 and injected under relatively high pressure into the coil 17, which is under suction pressure, will cause a rapid flow of refrigerant through the coil, in fact the liquid refrigerant in the apparatus will be re-circulated rapidly through the coil 17, the pipe 40, the surge tank 41 and the pipe 41, the injector 20 acting to impel and accelerate the flow of liquid through the circuit.

The frost forming on the tank 41 gives an indication of the level of liquid therein or if desired a gage glass (similar to 11 on drum 10) may be applied.

The valve 48 is adjusted to maintain the desired liquid level in the tank 41. An increased opening of valve 48 will cause the liquid level in the tank to lower and this in turn will result in a greater space between the spreader 43 and the top of the liquid in the tank and thus permit of more evaporation of refrigerant, if the necessary heat is supplied by additional flow of the relatively hot mixture through the coil 53.

The thermostat 38 controls the valve 39 which governs the quantity of mixture passing through the apparatus. In Fig. 1 I have shown mechanical connections from the thermostat 38 to valve 39 but obviously the electrical connections may be used as shown in Fig. 2 at 138 and 180 to operate mixture control valve 139.

The capacity of the apparatus depends upon its ability to condense refrigerating medium from the mixture. It will be noted that as long as the temperature of the zone or atmosphere in the separator drum, into which the mixture is discharged, is maintained in a "sub-cooled" condition (that is, at a temperature less than the condensing temperature corresponding to the pressure existing) all of the refrigerant in the mixture delivered to the apparatus will be condensed.

While all refrigerant in the mixture is condensed and this salvaged refrigerant is added and becomes a part of the liquid pool in the bottom of the separator drum, there is a small amount of evaporation from the surface of the liquid pool. The amount of this evaporation depends upon the temperature and pressure existing in the drum.

More heat is available around the lower portion of the coil 17 than around the upper portion and therefore the temperature of the coil is lower at its upper portion. It follows that the very light fog of evaporated refrigerating medium rising from the surface of the liquid pool is practically all condensed as it reaches the upper portion of the drum. In condensing, small particles of liquefied refrigerant are formed and entrained with the non-condensible gases. As heretofore explained these small particles of refrigerant are salvaged by passing same at high velocity along an angular path.

In Fig. 2 is shown a modified form of apparatus in which the pre-cooling tank 141 is annularly placed around the separator drum 110.

The parts of the structure shown in Fig. 2 are mostly similar in function to the parts of the structure shown in Fig. 1. These corresponding parts are designated in Fig. 2 by a similar numeral, increased by 100.

In Fig. 2 the refrigerating coil 117 is made up of a series of spiral sections, the outer helix of each section being in substantial contact with the wall of the drum 110. The inner helix of each section is provided with a transverse partition 181. The effect of this construction is to compel the gases rising in the drum 110 to take a circuitous path around the external surface of the coil 117.

In Fig. 2 it will be noted that the mixture pipe or nozzle 116 discharges above the surface of the liquid pool 166. As pointed out above the important matter is to have the mixture discharge into a zone or atmosphere maintained at a "sub-cooled" temperature, to effect condensation of the refrigerant in the mixture.

It will be understood that the automatic means to maintain uniform suction pressure on the pre-cooling tank, also the angular path for exit of non-condensibles both as shown in Fig. 1 may be applied to and used in combination with the apparatus shown in Fig. 2.

It will be obvious that the pre-cooling tanks and the separator drums may be refrigerated independently of each other by individual connections to the plant liquid refrigerating medium, and plant suction lines, and a two stage cooling effect on the mixture be obtained. The preferred constructions shown in the drawings possesses the advantage of recirculation of refrigerant with resulting increased efficiency.

In Fig. 1 numeral 70 designates an electrically operated valve placed in the suction pipe 50 which connects the tank 41 with the plant suction line 52. This valve 70 may be arranged, by suitable well known electrical connections, to close and open in response to variations in the plant condensing or head pressure. In a great many plants (when the systems are free from non-condensible gases) the condensing pressure is quite uniform over seasonal periods, and the condensing pressure only rises when air or other non-condensible gases are taken into the plant system.

In such plants, after the several adjustments noted above have been made to the purging apparatus, it is practical to arrange for the apparatus to be placed in and out of operation by merely opening and closing the valve 70 and as explained above, this may be automatically taken care of in relation to the head pressure existing in the plant system. Thus, as the pressure builds up, the valve 70 is opened, the purging apparatus goes into operation, and upon the purging of the non-condensible gas from the system—and the resulting lowering of head pressure—the valve 70 is closed.

It will be obvious that manual control of the valve 51 shown in Fig. 1, or the valve 151 of Fig. 2, will perform the same function insofar as placing the apparatus in and out of service.

I claim:

1. Apparatus to remove non-condensible gas from a mixture with a condensible refrigerating medium, which comprises a pre-cooling tank; automatic means including a spring balanced valve to maintain a substantially uniform suction on said tank during variations in the plant suction pressure; liquefied refrigerating medium in said tank; a separator drum; a heat absorbing element within said drum connected to said tank to refrigerate said drum; a pool of liquefied refrigerating medium in said drum; an outlet for non-condensible gas from said drum; a thermostat in said drum; an injector to feed liquid medium from said drum into said heat absorbing element; a pipe to convey said mixture through said tank and into said pool; a valve in said pipe controlled by said thermostat; and a casing intermediate of said pipe and said heat absorbent element.

2. Apparatus to remove non-condensible gas from a mixture with a refrigerating medium, which comprises a pre-cooling tank; automatic means including a spring balanced valve to maintain a substantially uniform suction on said tank during variations in the plant suction pressure; liquefied refrigerating medium in said tank; a separator drum; an outlet for non-condensible gas from said drum; a pool of liquefied refrigerating medium in said drum; a thermostat submerged in said pool; a heat absorbing element connected to said tank to refrigerate said drum; an injector to feed liquefied refrigerating medium from said pool into said element; a pipe to convey said mixture through said tank and into said drum and a valve in said pipe controlled by said thermostat.

3. Apparatus to remove non-condensible gas from a mixture with a refrigerating medium, which comprises a pre-cooling tank; a suction connection to said tank; liquefied refrigerating medium in said tank; a separator drum; an outlet for non-condensible gas from said drum; a thermostat in said drum; a heat absorbing element connected to said tank to refrigerate said drum; an injector to feed liquefied refrigerating medium into said element; a pipe to convey said mixture through said tank and into said drum and a valve in said pipe controlled by said thermostat.

4. Apparatus to remove non-condensible gas from a mixture with a refrigerating medium, which comprises a pre-cooling tank; a suction connection to said tank; liquefied refrigerating medium in said tank; a separator drum; an outlet for non-condensible gas from said drum; liquefied refrigerating medium in said drum; a pipe to convey said mixture through said tank into said drum; a heat absorbing element connected to said tank to refrigerate said drum and an injector to feed liquefied medium from said drum into said heat absorbing element.

5. Apparatus to remove non-condensible gas from a mixture with a refrigerating medium, which comprises a pre-cooling tank; automatic means including a spring balanced valve to maintain a substantially uniform suction on said tank during variations in the plant suction pressure; liquefied refrigerating medium in said tank; a separator drum; an outlet for non-condensible gas from said drum; a pipe to convey said mixture through said tank into said drum; and a heat absorbing element connected to said tank to refrigerate said drum.

6. Apparatus to remove non-condensible gas from a mixture with a refrigerating medium, which comprises a pre-cooling tank; a suction connection to said tank; a separator drum; a heat absorbing element connected to said tank to refrigerate said drum; an outlet for non-condensible gas from said drum; and a pipe to convey said mixture through said tank and into said drum.

7. Apparatus to remove non-condensible gas from a mixture with a refrigerating medium, which comprises a pre-cooling tank; a suction connection to said tank; a separator drum; means to refrigerate said drum; an outlet for non-condensible gas from said drum and pipe means to convey said mixture through said tank and into said drum.

8. Apparatus to remove non-condensible gas from a mixture with a refrigerating medium, which comprises a pre-cooling tank; means to refrigerate said tank; a separator drum; means to refrigerate said drum; an outlet for non-condensible gas from said drum; a thermostat in said drum; a pipe to convey said mixture through said tank and into said drum and a valve in said mixture pipe controlled by said thermostat.

9. A separator to remove non-condensible gas from a mixture with a refrigerating medium, which comprises a drum; a refrigerating coil in said drum; a pool of liquid refrigerating medium in said drum; an outlet for non-condensible gas from said drum; a pipe to inject said mixture into said pool; and a casing intermediate of said pipe and said coil.

10. A separator to remove non-condensible gas from a mixture with a refrigerating medium, which comprises a drum; a refrigerating coil in said drum; a pool of sub-cooled liquefied refrigerating medium in said drum; an outlet for non-condensible gas from said drum; a thermostat in said drum; a pipe to inject said mixture into said pool; a casing intermediate said pipe and said coil and a valve in said pipe controlled by said thermostat, in relation to the temperature within said drum.

11. A separator to remove non-condensible gas from a mixture with a refrigerating medium, which comprises a drum; a refrigerating element in said drum in the form of a spiral coil, the largest helix of said coil being in substantial contact with the wall of said drum, and the smallest helix of said coil being blocked off transversely to form a baffle element; means to withdraw non-condensible gas from the space in the drum outside of said spiral coil and means to introduce said mixture into the space enclosed by said spiral coil.

12. Apparatus to remove non-condensible gas from a mixture with a refrigerating medium, which comprises a separator drum; a heat absorbing element in said drum; an outlet for non-condensible gas from said drum; a pre-cooling tank annularly disposed about said drum; liquefied refrigerating medium in said tank; a suction connection to said tank; flow connections from said heat absorbing element to said tank; and a pipe to convey said mixture through said tank and into said drum.

13. Apparatus to remove non-condensible gas from a mixture with a refrigerating medium, which comprises a separator drum; a heat absorbing element in said drum; an outlet for non-condensible gas from said drum; a pre-cooling tank annularly disposed about said drum; liquefied refrigerating medium in said tank; a suction connection to said tank; and a pipe to convey said mixture through said tank and into said drum.

14. In an apparatus to remove non-condensible gas from a mixture with a condensible refrigerating medium, the combination of a separator drum; a refrigerating element in said drum; a pool of salvaged liquefied refrigerating medium in said drum; a tank annularly disposed around said drum; flow connections from said element to said tank; an injector fed from said pool to maintain a circulation of liquefied refrigerating medium through said element and said tank; and a pipe to convey said mixture through said tank and into said drum.

15. In an apparatus to remove non-condensible gas from a mixture with a condensible refrigerating medium; the combination of a separator drum; a refrigerating element in said drum; a tank annularly disposed around said drum; liquefied refrigerating medium in said tank; flow connections from said element to said tank to maintain flooded operation of said element; and a pipe to convey said mixture through said tank and into said drum.

16. In an apparatus to remove non-condensible gas from a mixture with a condensible refrigerating medium; the combination of a separator drum; a refrigerating element in said drum; a tank annularly disposed around said drum; and an injector to maintain a circulation of liquefied refrigerating medium through said element and said tank; and a pipe to convey said mixture through said tank and into said drum.

17. In an apparatus to remove non-condensible gas from a mixture with a condensible refrigerating medium, the combination of a separator drum; means to refrigerate said drum; an annularly disposed tank around said drum; means to refrigerate said tank to insulate said drum; and a pipe to convey said mixture through said tank and into said drum.

18. In an apparatus to remove non-condensible gas from a mixture with a condensible refrigerating medium, the combination of a separator drum; a refrigerating element in said drum; a pool of liquefied refrigerating medium in said drum; a tank; flow connections from said element to said tank; an injector fed from said pool to maintain a circulation of liquefied refrigerating medium through said element and said tank; and a pipe to convey said mixture through said tank and into said drum.

19. The method of separating a non-condensible gas from a mixture with a condensible refrigerating gas used in a refrigerating plant, which comprises the initial cooling of said mixture by passage through a pre-cooling tank; the introduction of said pre-cooled mixture into a drum maintained at a pressure and temperature adequate to liquefy said refrigerating gas; releasing the non-condensible gas from said drum; and circulating said salvaged liquefied refrigerating gas, under plant suction, in heat transfer relation to said drum and said tank to refrigerate said drum and tank by vaporizing said salvaged gas.

MATHIAS R. KONDOLF.